United States Patent [19]
Montag

[11] 3,973,810
[45] Aug. 10, 1976

[54] HYDROSTATIC GAS BEARING SYSTEMS
[76] Inventor: Mordechai Montag, Three Malton Road, Plainview, N.Y. 11803
[22] Filed: Oct. 23, 1974
[21] Appl. No.: 517,085

[52] U.S. Cl.................................. 308/9; 308/122; 308/DIG. 1
[51] Int. Cl.²........................................ F16C 17/00
[58] Field of Search............ 308/9, 5 R, 122, DIG. 1

[56] References Cited
UNITED STATES PATENTS
3,799,628   3/1974   Gaasbeck et al. .................. 308/9 X

*Primary Examiner*—M. H. Wood, Jr.
*Assistant Examiner*—Gene A. Church

[57] ABSTRACT

A hydrostatic gas bearing system where members are frictionlessly movable relative to each other and where the stabilizing and confining preload force holding said members to movement in a predetermined direction is transmitted through a gas film by floating pads that maintain virtually constant gas film thickness regardless of pressure and which by their floating action compensate for limited dimensional inaccuracies in said members.

4 Claims, 4 Drawing Figures

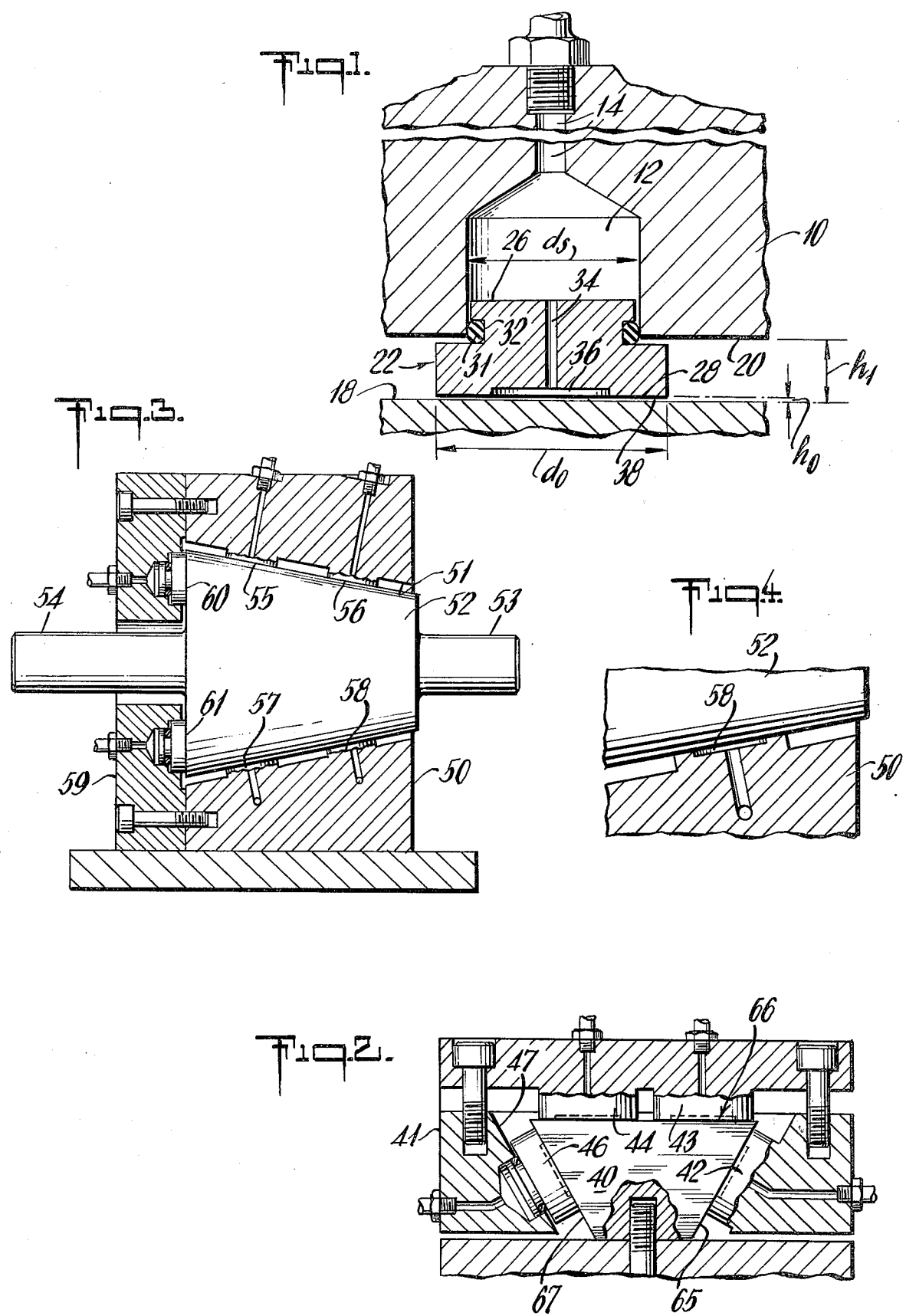

HYDROSTATIC GAS BEARING SYSTEMS

This invention relates to a gas bearing system and in particular to a gas bearing system that is self-stabilizing under variable load conditions.

Presently gas bearing systems are creatures of demand where higher and higher speeds are required so that normal lubricating requirements become intolerable and incapable of minimizing heat and friction losses in an acceptable domain. Gas bearings have many advantages over ordinary liquid lubricants in that gas bearings run cool, no warming-up period, low frictional torque, no need to constantly supply liquid lubricants and so on. There are many other advantages to gas bearings.

The present gas bearing system utilizes a series of fixed pads or orifices through which a gas under pressure is supplied. The pads permit the flow of gas to penetrate the space which surrounds the bearing surface and the movable load element such as a shaft, rod and the like. The film of gas within this space represents the bearing and it supports the load under varying load conditions. Fixed pad bearings depend on the geometrical relationship between the bearing surfaces. In order to obtain proper film thickness and load carrying capacity the bearing components have to be machined to extremely fine tolerances in their "form features" i.e., flatness, roundness, cylindricity, conical surface, etc., and their "dimensional" tolerances i.e., diameter, length, thickness, cross section, etc.

The invention contemplated herein achieves an accuracy comparable to any other hydrostatic gas bearing system without the requirement of extra fine "dimensional" tolerances. Further, the object of the invention is to provide a tool for design of gas bearings with larger flexibility for load fluctuation and for design of gas bearing system with self seeking best operating condition. Furthermore, the invention enables one to save on fabrication costs as it depends for accuracy on the "form features" of the bearing surfaces while the "dimensional" tolerances are of secondary importance. The invention also provides for controlled gas film thickness by predetermined dimensional design which enables better bearing accuracies as form features without the corresponding dimensional features and are readily machinable to finer tolerances.

Further objects and advantages will become more apparent from the description embodied herein and when taken with a study of the accompanying drawings.

FIG. 1 shows in section a portion of a gas bearing with respect to a floating gas pad according to the invention.

FIG. 2 shows a dove-tail gas bearing system according to one embodiment of the invention.

FIG. 3 shows a rotary gas bearing system according to another embodiment of this invention.

FIG. 4 shows an enlarged portion of bearing of FIG. 3.

Now describing the invention in more detail, there is shown in FIG. 1 a gas bearing element partially and in section which comprises a slide or bearing body 10 having a cylindrical reservoir 12 through which an inlet orifice 14 communicates carrying a source of gas under controlled pressure conditions not shown. The system further comprises a flat or guide bearing surface 18 in proximity to the bearing body 10 and separated from it in a manner to be described.

A flating gas pad 22 reposing between the bearing body 10 and surface 18 is disposed to float in a gas medium within the reservoir 12 and a gas film above the bearing surface 18. In particular, the pad 22 as composed is formed in the shape of a thick flat washer whose upper portion 26 has a diameter of $ds$ and a lower portion 28 having a diameter of $do$. The upper portion 26 is disposed to fit into the reservoir 12 and further disposed to having an axial displacement limited by the shoulder barrier 30 of the lower portion 28. The upper and lower portions of said pad are divided by an annular groove 32 and placed therein is a seal ring 34 for purposes to be subsequently described.

The floating pad member 22 has an axial hole 34 in communication with a reservoir 36 at its terminal at the lower part of said lower portion 28, for receiving gas from the reservoir 12 to permit said gas to form a thin film 38 between the surface 28 and the flat surface 18.

In operation the gas from its source passes through orifice 14 and impinges on an area 26 whose dimension is determined by the area diameter $ds$. The gas also penetrates through axial hole or passage 34 of the pad 22 and into the reservoir 36 and under the surface area 28, the said surface area dimension being determined by diameter $do$. The upper pressure on the surface area 28 produces a gas film upon which the pad 22 floats. The total force on the upper surface is determined by the pressure thereon and the area thereof which is in turn a function of the diameter $ds$. Similarly, the upward lift force on surface 28 is determined by the pressure of the gas film and the surface area which is in turn a function of the diameter $do$. Because of the gas film 38 between surface 28 and flat surface 18 a pressure drop will occur between reservoir 36 and the atmospheric pressure around diameter $do$. This pressure drop will reduce the total force acting on surface 28. The floating gas pad is designed to have a built-in ratio between $ds$ and its corresponding area and $do$ and its corresponding area, so that the force on surface defined by diameter $ds$ and the force on surface defined by diameter $do$ are equal and opposed and a thin film of gas 38 will be maintained virtually constant regardless of supply pressure changes. The seal ring 34 allows pad 22 slight movement up and down and also angularly so as to maintain film thickness $ho$ with slight variations of height $hi$.

As the force on body 10 is the same force as described above which is also the case for surface 18, this force being dependent on the supply pressure and having virtually no effect on gas film thickness $ho$, it can be assumed that it is the load carrying capacity of the floating gas pad and is dependent on the pad size and supply pressure only.

It is also evident that because of the flexibility of the seal ring, frictionless movement can be achieved between body 10 and surface 18 with distance $hi$ not necessarily constant. This property is useful in applications requiring constant force frictionless bearings where distance $hi$ can vary as long as the seal is effective. This constant force feature with combination of the constant film thickness $ho$ is also the basis for bearing systems described below.

In FIG. 2 there is shown a bearing according to one embodiment of the invention which comprises a fixed immovable elongated member or guide rail 40 disposed to have a trapozoidal or dove-tail configuration, and a movable member 41 slidably engageable with the guide rail and disposed to move upon a film of gas residing within the space separating the guide rail and movable member along the dove-tail joints. In particular, a series of fixed gas pads 42, 43 and 44 each are carried by the movable member 41 along the glide or slide surfaces of both members, e.g., the film of gas confined between the respective glide surfaces. A floating pad 46 of same gliding surface area is also carried by movable member 41. The pressure supplied to the floating pad will cause it to exert a force through a gas film in a manner as to try to squeeze all pads, the fixed 42, 43 and 44 and the floating 46, around the dove-tail guide rail 40. As gas pressure is supplied to all pads, gas films will be established between all pads and dove-tail 40 and the systems will balance itself, proper sizing of pads and optional control of supply pressures to the fixed and floating pads can be used for balancing the system for external loads from different directions.

Two or more cross sections as shown in FIG. 2 moving over a dove-tail 40 will comprise a linear gas bearing slide. The accuracy of this type of slide is only limited by the flatness of dove-tail surfaces 65 and 66. The flatness of surface 67 is to be of suitable quality but the geometrical location relative to surfaces 65 and 66 does not have to be of the order of accuracy required by an all fixed pad construction, as the floating pad will maintain a constant film thickness and force on surface 67 because of the floating gas pad properties. This force will also cause the fixed pads to maintain desired accurate tracking of surfaces 65 and 66 of the dove-tail.

FIG. 3 shows still another embodiment of the invention and wherein the gas bearing is maintained in a device having rotary motion as opposed to linear motion described with respect to FIG. 2. In FIG. 3 there is shown a fixed base or immovable member 50 having a tapered bore 51 disposed to receive a tapered rotary shaft 52 whose opposing ends terminate in axles 53 and 54. The tapered bore 51 is further disposed to have about the circumference thereof a series of spaced fixed gas pads 55, 56, 57 and 58 each for the purpose of producing a gas film within the gap separating the tapered shaft and bore. Arrangement of fixed gas pads as shown is to be repeated in at least two other cross sections so that fixed gas bearings will support the shaft 53 symmetrically. The base 50 has an end plate 59 terminating the larger diameter of the tapered bore and is disposed to have mounted therein a series of floating as pads 60, 61 so that said pads form a gas film barrier and a bearing to the thrust forces created by the fixed pads on the tapered rotary shaft. In operation, the forces created by the gas pad along the tapered periphery of the bore tend to urge the shaft in a direction toward the plate 59. The floating pads create a barrier to this urge and thereby maintains the equilibrium of the system.

It may be appreciated that other bearing configurations are obtainable, but that the foregoing have been described with the idea of conveying the broad concept and idea of floating gas pads for giving stability and precision under varying load conditions.

Having described the invention, what is claimed is:

1. A hydrostatic gas bearing system using a gas pressure source for frictionless transmittal through a controlled gas film of a balancing force for maintaining close guided relationship between frictionlessly suspended bodies, comprising
    a. a first carrying body,
    b. a second body having a guide surface,
    c. one or more floating pads flexibly mounted and pneumaticaly sealed into first carrying body having opposed surfaces dimensionaly interrelated ($d_s$ and $d_o$) and pneumaticaly interconnected with sealed surface in first carrying body ($ch_s$) exposed to said gas supply pressure,
    d. bearing surfaces on said first and second bodies geometricaly located and frictionlessly supported by a gas film to oppose and balance forces frictionlessly transmitted from the floating pads through a gas film ($h_o$) to the said guide surface on the second body, Said geometric arrangements allowing frictionless movement perpendicular to said forces and in the direction of the bearing surfaces with the floating pad serving to maintain balanced relationship between bearing and guide surfaces and to compensate for limited dimensional variations.

2. A system according to claim 1 and wherein said bodies are each disposed to having a planer geometric configuration so that their bearing motion is linear.

3. A system according to claim 1 and wherein said bodies are each disposed to having a geometric surface of revolution configuration so that their bearing motion is rotational.

4. A system according to claim 1 and wherein said bodies are each disposed to having a combined linear and rotational geometric configuration so that bearing motion is either linear or rotational or both.

* * * * *